(12) United States Patent
Mitra

(10) Patent No.: US 6,826,605 B1
(45) Date of Patent: Nov. 30, 2004

(54) INTERNET PROTOCOL EXCHANGE NETWORK NUMBER AUTOMATIC DISCOVERY METHOD

(75) Inventor: Amol Mitra, Granite Bay, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 743 days.

(21) Appl. No.: 09/222,388

(22) Filed: Dec. 29, 1998

(51) Int. Cl.[7] .................. G06F 15/173; H04L 12/28
(52) U.S. Cl. .................. 709/223; 709/230; 709/224; 370/395.52
(58) Field of Search .................. 709/223, 230, 709/224, 225; 370/401, 405, 395.52

(56) References Cited

U.S. PATENT DOCUMENTS 5,805,594 A * 9/1998 Kotchey et al. ............ 370/401
6,061,356 A * 5/2000 Terry ......................... 370/401
6,185,218 B1 * 2/2001 Ratcliff et al. .............. 370/405

* cited by examiner

Primary Examiner—Beatriz Prieto

(57) ABSTRACT

A method of automatically determining a number of an IPX network without user intervention. Initially, the client locates on a network an IPX packet containing a predetermined destination Ethernet address. Thereafter, the client determines whether said IPX packet is broadcast with a specific type of protocol. For a service advertising protocol or a routing information protocol, the client extracts the network number from said IPX packet if an IPX header source network number equals an IPX header destination number and the network number is not zero.

7 Claims, 1 Drawing Sheet

INTERNET PROTOCOL EXCHANGE NETWORK NUMBER AUTOMATIC DISCOVERY METHOD

Figure 1:
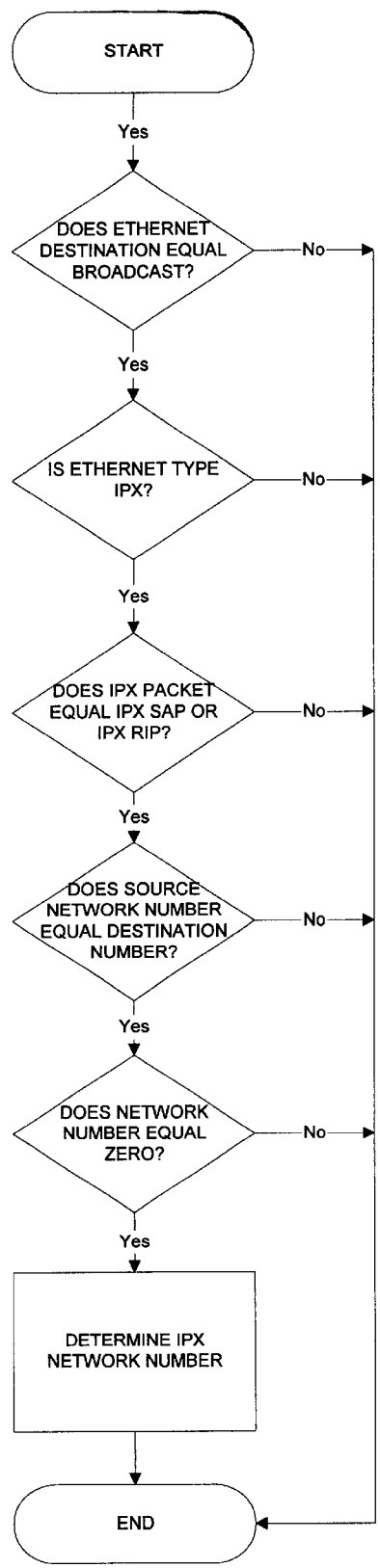

The present invention generally relates to networks, and more particularly to a method that allows switches, hubs, or routers to discover its own network number without user intervention.

Internet protocol exchange (IPX) clients, i.e., switches, hubs, and routers, initially assume a network number of zero as they send out their packets. Traditionally, for a client to know its network number, a network administrator must manually assign the network number to the client. A problem exists in that the operation of manually assigning network numbers to the client is cumbersome, especially when multiple clients exist on the network.

Some vendors utilize an IPX general service query (GSQ) packet to establish the network number. By generating the IPX GSQ packet, however, every server/router on the local segment responds to the request to generate unnecessary traffic on the network, and consume a considerable amount of bandwidth. Thus, the system is inefficient, especially if a GSQ request is sent from a remote site to a central site over a wide area network consuming network bandwidth in proportion to the number of services available on the entire network.

Accordingly, in response to the problems discussed above, a primary object of the present invention is to provide an improved method for automatically discovering a network number.

Other objects and advantages will become apparent upon reading the following detailed description, while referring to the attached drawing, in which:

FIG. 1 is a flow chart of the preferred embodiment for carrying out the method of the present invention.

TABLE OF ACRONYMS

This patent utilizes several acronyms. The following table is provided to aid the reader in determining the meaning of the several acronyms:

GSQ = general service query.
GSR = general service response.
IPX = internet protocol exchange.
NSQ = nearest service query.
SAP = service advertising protocol.
RIP = routing information protocol.

DETAILED DESCRIPTION

Broadly stated, the present invention is directed to an improved method for allowing devices to automatically discover a network number.

According to a first method of the present invention, this automatic discovery operation compels a client to act as a passive listener. The client is a router, switch, or hub that requires an IPX network number. After a client boots up or is powered on, the client initiates an IPX task as a passive listener. As a passive listener, the client listens on a network to discover an IPX packet containing a predetermined destination Ethernet media access control (MAC) address of broadcast 0xFFFFFFFFFFFF. Address 0xFFFFFFFFFFFF indicates that every device on the network needs to process the packet.

When such a packet is found, the client sends the packet to the IPX task to determine whether the IPX packet is of a certain type of protocol. Specifically, the client checks for an IPX routing information protocol (RIP) or an IPX service advertising protocol (SAP) packet. Typically, Novell routers or servers advertise their routes or services by broadcasting an IPX RIP response and IPX SAP general service response (GSR) packets about every sixty seconds.

If the packet is the IPX RIP or IPX SAP, the IPX task or configuration task extracts the network number from the IPX packet if an IPX header source network number equals an IPX header destination number and the network number is not zero.

A pseudo code for auto discovery is shown as follows:

```
if (Ethernet Destination Physical Address EQUALS "Broadcast")
AND
    /* search for IPX type Ethernet */
    if (Ethernet Type EQUALS 0x8137) AND
    if (IPX packet EQUALS (IPX SAP socket OR IPX RIP socket))
AND
    if (IPX header source network number EQUALS IPX header
destination number) AND
    if (IPX network number in packet NOT_EQUAL_TO zero)
    then
        learn IPX network number from the packet received.
```

Additionally, according to a second method of the present invention, in time critical situations the switch/hub actively determines the network number with a forced auto discovery mechanism. The forced auto discovery mechanism commences if a device initiates a IPX packet such as a diagnostic or ping request, and the device sending the request has not yet discovered its network number. Initially, the IPX diagnostic or ping request packet is queued while the network number is discovered. To discover the network number, the switch/hub initiates the IPX task of the present invention and generates a nearest service query (NSQ) packet with a IPX network number of zero as the source, and with the IPX destination network number contained in the diagnostic or ping request in the IPX header.

Since only the nearest service responds to the NSQ packet, bandwidth is conserved. If a server/router exists on the local segment, the server/router loads the local IPX source and destination network numbers and sends a response back to the client's IPX task. This packet is an Ethernet unicast packet directed back to the requesting switch/hub. The switch/hub detects that the response is a unicast IPX SAP NSQ directed to the switch/hub request. From the response packet, the switch/hub learns the IPX network number. Once the IPX task discovers the network number, it forwards the queued diagnostic or ping request packet to the IPX packet's destination.

From the foregoing description, it should be understood that an improved and automatic network number discovery method has been shown and described which has many desirable attributes and advantages. The IPX task of the present invention automatically discovers a network number, thereby reducing unnecessary traffic on the network and the need to manually configure devices on the network with their IPX network number. Additionally, the IPX task performs a forced automatic discovery mechanism to quickly learn a network number during time critical situations.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method of discovering an internet protocol exchange (IPX) network number of a network, the network communicating packets, the packets including a source and a destination address, the method comprising the steps of:

initiating a passive listener to locate an IPX packet containing a predetermined destination address;

locating said IPX packet containing said predetermined destination address;

determining whether said IPX packet is broadcast with a specific type of protocol; and extracting the network number from said IPX packet if an IPX header source network number equals an IPX header destination number and the network number is not zero.

2. The method as defined in claim 1 wherein said predetermined destination address is an Ethernet media access control (MAC) address broadcast of 0xFFFFFFFFFFFF.

3. The method as defined in claim 1 wherein said specific IPX packet protocol type is a IPX service advertising protocol (SAP) or routing information protocol (RIP) socket.

4. The method as defined in claim 1 wherein the steps set forth therein are carried out in an other than critical time situation, the method further comprising the following steps in a time critical situation:

initiating a forced automatic discovery mechanism by generating a request signal with an IPX network number of zero as the source to determine the client's network number in a time critical situation;

detecting a response packet in response to said request signal; and extracting the network number from said response packet.

5. The method as defined in claim 4 wherein said generated request signal is a IPX SAP NSQ signal.

6. The method as defined in claim 4 wherein said time critical situation includes situations when a device requests a diagnostic or ping before the network number has been learned by the device.

7. A method of discovering an internet protocol exchange (IPX) network number of a network during critical and other than critical time situations, the network communicating packets, the packets including a source and a destination address, the method during other than critical time situations comprising the steps of:

initiating a passive listener to locate an IPX packet containing a predetermined destination address;

locating said IPX packet containing said predetermined destination address;

determining whether said IPX packet is broadcast with a specific type of protocol; and extracting the network number from said IPX packet if an IPX header source network number equals an IPX header destination number and the network number is not zero; and, during a critical time situation, the steps of:

initiating a forced automatic discovery mechanism by generating a IPX SAP NSQ signal with an IPX network number of zero as the source to determine the client's network number;

detecting a response packet in response to said request signal; and extracting the network number from said response packet.

* * * * *